US012568143B2

(12) United States Patent
Zhou et al.

(10) Patent No.: US 12,568,143 B2
(45) Date of Patent: Mar. 3, 2026

(54) SYSTEM, DEVICE, METHOD AND STORAGE MEDIUM FOR PLC CONNECTION

(71) Applicant: Siemens Aktiengesellschaft, Munich (DE)

(72) Inventors: Zhen Hua Zhou, Shanghai (CN); Wen Chao Zou, Shanghai (CN); Hai Feng Wang, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 57 days.

(21) Appl. No.: 18/695,160

(22) PCT Filed: Sep. 29, 2021

(86) PCT No.: PCT/CN2021/121931
    § 371 (c)(1),
    (2) Date: Mar. 25, 2024

(87) PCT Pub. No.: WO2023/050219
    PCT Pub. Date: Apr. 6, 2023

(65) Prior Publication Data
    US 2024/0396970 A1    Nov. 28, 2024

(51) Int. Cl.
    *H04L 67/12*        (2022.01)
    *H04L 12/66*        (2006.01)
(52) U.S. Cl.
    CPC .............. *H04L 67/12* (2013.01); *H04L 12/66* (2013.01)
(58) Field of Classification Search
    CPC ................................ H04L 67/12; H04L 12/66
    (Continued)

(56) References Cited

U.S. PATENT DOCUMENTS

2017/0343967 A1    11/2017    Verma
2019/0075116 A1     3/2019    Nishi ..................... H04L 63/102
    (Continued)

FOREIGN PATENT DOCUMENTS

CN    109 462 571    3/2019    ............. H04L 29/06
CN    110 650 084    1/2020    ............. H04L 12/66
    (Continued)

OTHER PUBLICATIONS

Search Report for International Application No. PCT/CN2021/121931, 11 pages, Jun. 24, 2022.
    (Continued)

*Primary Examiner* — Dominic D Saltarelli
(74) *Attorney, Agent, or Firm* — Slayden Grubert Beard PLLC

(57)    ABSTRACT

Various embodiments of the teachings herein include a system for PLC connection. An example system may include: an automatic converter set on a third-party platform; a local adapter set on a local computer to access locally stored PLC information; and a set of intelligent communication interface adapters set on respective edge devices to access a PLC through a communication protocol connector compatible with multiple industrial networks. The automatic converter obtains information of each respective edge device through the intelligent communication interface adapter, and obtains information of each PLC through the local adapter and/or corresponding intelligent communication interface adapter. Based on a preset voting mechanism, the converter triggers the edge devices and the PLC for connectivity detection and voting, and select an individual edge device and a PLC to be connected according to the number of votes of each respective edge device and each PLC.

8 Claims, 2 Drawing Sheets

(58) Field of Classification Search
USPC ......................................................... 375/259
See application file for complete search history.

(56) References Cited

U.S. PATENT DOCUMENTS

| | | | |
|---|---|---|---|
| 2020/0074828 A1 | 3/2020 | Mousavi et al. | |
| 2020/0257280 A1 | 8/2020 | Heindl et al. | |
| 2020/0259896 A1 * | 8/2020 | Sachs ...................... | H04L 67/12 |
| 2021/0089009 A1 | 3/2021 | Höfele et al. | |
| 2021/0168662 A1 | 6/2021 | Dowlatkhah ......... | H04W 28/24 |
| 2021/0232123 A1 | 7/2021 | Kuikka .............. | G05B 19/4185 |

FOREIGN PATENT DOCUMENTS

| | | | | |
|---|---|---|---|---|
| CN | 113 176 730 | 7/2021 | ............. | G05B 13/04 |
| EP | 3917114 A1 * | 12/2021 | ............. | H04L 65/75 |

OTHER PUBLICATIONS

Extended European Search Report, Application No. 21958807.6, 10 pages, Mar. 28, 2025.

* cited by examiner

SYSTEM, DEVICE, METHOD AND STORAGE MEDIUM FOR PLC CONNECTION

CROSS-REFERENCE TO RELATED APPLICATIONS

This application is a U.S. National Stage Application of International Application No. PCT/CN2021/121931 filed Sep. 29, 2021, the contents of which are hereby incorporated by reference in their entirety.

TECHNICAL FIELD

The present disclosure relates to industrial technologies. Various embodiments of the teachings herein include systems, devices, methods, and/or computer readable storage medium for programmable logic controller (PLC) connection.

BACKGROUND

In order to realize the connection and control of a PLC, such as SIMATIC S7 Series PLC, the PLC is usually configured and deployed by a PLC developing system, such as TIA portal. Then, the PLC developing system connects and controls the PLC through an industrial network, or a third party connects and controls the PLC through the industrial network via open-sourced SNAP7 protocol. At present, PLC connection and control are based on local solutions, which can only be deployed to an edge device or a local industrial computer at most.

Therefore, those skilled in the art are also committed to finding other solutions for PLC connection and control.

SUMMARY

Teachings of the present disclosure include systems, devices, methods, and computer readable storage medium for PLC connection. For example, some embodiments include a system for PLC connection comprising: an automatic converter set on a third-party platform, a local adapter set on a local computer, and at least one intelligent communication interface adapter set on at least one edge device; the local adapter is to access locally stored PLC information; the intelligent communication interface adapter is to access a PLC through a communication protocol connector which is compatible with multiple industrial networks; the automatic converter is to obtain information of each edge device through the intelligent communication interface adapter set on each edge device, and to obtain information of each PLC through the local adapter and/or corresponding intelligent communication interface adapter; based on a preset voting mechanism, to trigger each edge device and each PLC for connectivity detection and voting, and select an edge device and a PLC to be connected according to the number of votes of each edge devices and each PLC.

In some embodiments, the automatic converter comprises: a registration module is to obtain information of each edge device through the intelligent communication interface adapter set on each edge device, and obtain information of each PLC through the local adapter and/or corresponding intelligent communication interface adapter; a voting system is to trigger each edge device and each PLC for connectivity detection according to a set time interval, obtain voting performed by each edge device and each PLC on those connected with itself, as well as a state fed back by each edge device and each PLC, and obtain the number of votes and states of every edge device and every PLC; and an automatic awareness system is to determine a PLC to be connected and an edge device to connect to the PLC according to the number of votes and the state of each edge device and each PLC, and to connect determined PLC through determined edge device.

In some embodiments, the local adapter, the intelligent communication interface adapter and the automatic converter are encapsulated into a micro service container respectively.

In some embodiments, the third-party platform includes: a cloud based low code platform; the communication protocol is open source SNAP7 protocol; the locally stored PLC information is PLC information in a PLC developing system.

As another example, some embodiments include a device for PLC connection comprising: a registration module is to obtain information of each edge device through the intelligent communication interface adapter set on each edge device, and obtain information of each PLC through the local adapter and/or corresponding intelligent communication interface adapter; a voting system is to trigger each edge device and each PLC for connectivity detection according to a set time interval, obtain voting performed by each edge device and each PLC on those connected with itself, as well as a state fed back by each edge device and each PLC, and obtain the number of votes and states of every edge device and every PLC; and an automatic awareness system is to determine a PLC to be connected and an edge device to connect to the PLC according to the number of votes and the state of each edge device and each PLC, and to connect determined PLC through determined edge device.

As another example, some embodiments include a method for PLC connection comprising: obtaining information of each edge device and each PLC connected to a network; triggering each edge device and each PLC for connectivity detection according to a set time interval, and obtaining voting performed by each edge device and each PLC on those connected with itself and a state fed back by each edge device and each PLC, so as to obtain the number of votes and states of every edge device and every PLC; determining a PLC to be connected and an edge device to connect to the PLC according to the number of votes and states of every edge device and every PLC, and connecting determined PLC through determined edge device.

In some embodiments, obtaining information of each edge device and each PLC connected to a network comprises: obtaining information of each edge device through each intelligent communication interface adapter set on each edge device; obtaining locally stored information of PLC through a local adapter set on the local computer, and/or obtaining information of PLC deployed on each edge device through corresponding intelligent communication interface adapter set on each edge device.

In some embodiments, the third-party platform includes: a cloud based low code platform.

As another example, some embodiments include a system for PLC connection comprising: at least one memory, to store a computer program; and at least one processor, to call the computer program stored in the at least one memory to perform one or more of the methods for PLC connection mentioned herein.

As another example, some embodiments include a non-transitory computer-readable storage medium, on which a computer program is stored, the computer program is to be executed by a processor to implement one or more of the methods for PLC connection mentioned herein.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

Figure 1:
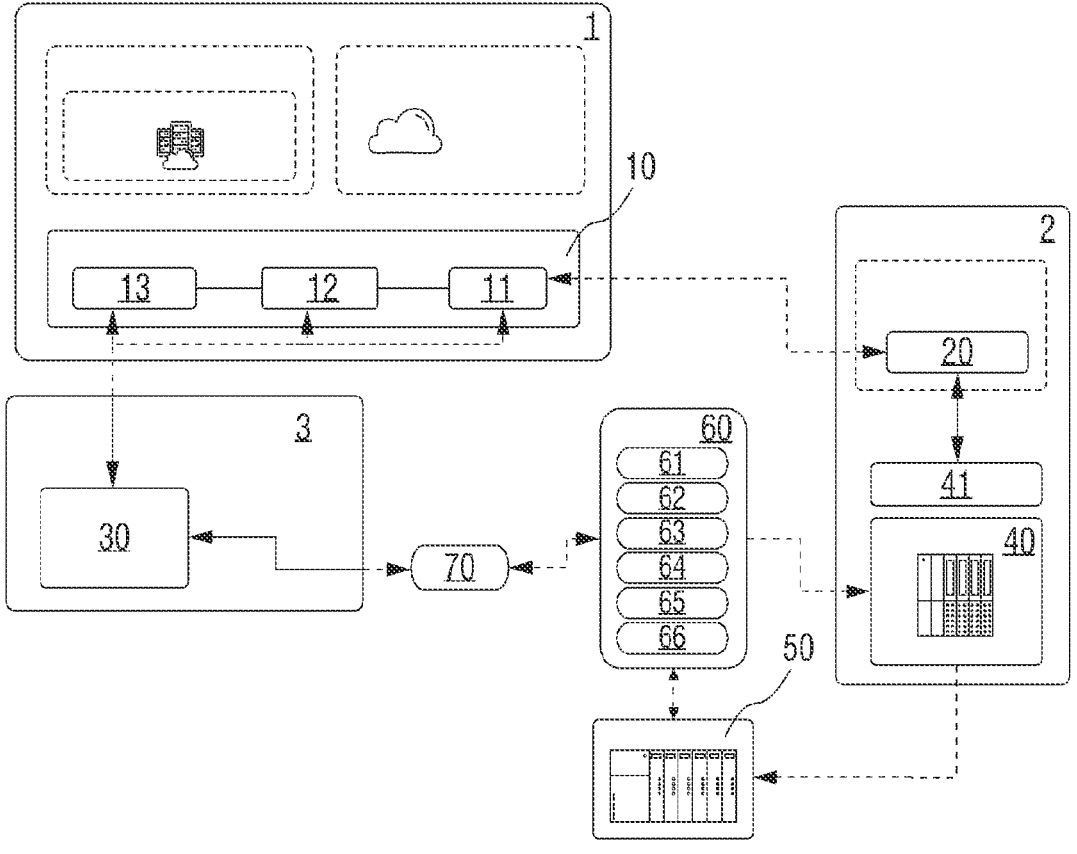
FIG. 1 is a schematic diagram illustrating an example system for PLC connection incorporating teachings of the present disclosure.

The reference numerals are as follows:

| Reference numeral | Object |
| --- | --- |
| 1 | third-party platform |
| 10 | automatic converter |
| 11 | registration module |
| 12 | voting system |
| 13 | automatic awareness system |
| 2 | local computer |
| 20 | local adapter |
| 3 | edge device |
| 30 | intelligent communication interface adapter |
| 40 | PLC developing system |
| 41 | developing kit |
| 50 | PLC |
| 60 | industrial network |
| 61 | Ethernet/IP |
| 62 | ProfiNET |
| 63 | OPC UA |
| 64 | Modbus TCP |
| 65 | PowerLink |
| 66 | EtherCAT |
| 70 | SNAP7 protocol connector |
| S21~S23 | processes |
| 31 | memory |
| 32 | processor |
| 33 | bus |

DETAILED DESCRIPTION

It can be seen from above mentioned technical solutions, an automatic converter may be set on the third-party platform, a local adapter for accessing PLC information may be set on the local computer, and an intelligent communication interface adapter for accessing PLC through industrial network protocol may set on the edge device, so that the automatic converter can obtain the information of each edge device and each PLC through the intelligent communication interface adapter and the local adapter, then trigger each edge device and each PLC to conduct connectivity detection and to vote according to a detection result, and then determine the PLC to be connected and the edge device to connect to the PLC according to the number of votes, then through the determined edge equipment to connect the determined PLC, the universality and effectiveness of PLC connection are improved.

In embodiments of the present disclosure, in order to improve the universality of connecting and controlling the PLC, it is considered to package the connection to the PLC as a service and enable it to be deployed on any third-party platform, such as cloud-based platform, such as low code platform, etc. In some embodiments, there is a bridge between the third-party platform and the PLC, that is, an automatic converter is set on the third-party platform, the automatic converter may obtain information of each edge device and each PLC deployed to each edge device, and set a voting mechanism for each edge device and each PLC, select an edge device and a PLC to be connected based on the number of votes obtained through connection detections.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail as not to unnecessarily obscure aspects of the examples.

FIG. 1 is a schematic diagram illustrating an example system for PLC connection incorporating teachings of the present disclosure. As shown in FIG. 1, the system may include an automatic converter 10 set on the third-party platform 1, a local adapter 20 set on the local computer 2, and at least one intelligent communication interface adapter 30 set on at least one edge device 3.

The local adapter 20 may be encapsulated as a micro service container, such as a Docker container, to access locally stored PLC information, for example to access PLC information in a PLC developing system 40 through a developing kit 41 of the PLC developing system, such as the openness component of TIA portal. Generally, the PLC developing system 40 will initialize and configure a corresponding PLC 50 according to the PLC information to complete the deployment of the PLC 50, and release the PLC information after the deployment is completed. Therefore, the local adapter 20 may obtain the PLC information from the PLC developing system 40 before the PLC information is released by the PLC developing system 40.

The intelligent communication interface adapter 30 may be encapsulated as a micro service container, such as a Docker container, to access the corresponding PLC 50 through a communication protocol connector, such as an open source SNAP7 protocol connector 70, which is compatible with multiple industrial networks 60. PLC 50 here may refer to the PLC initialized and configured by the PLC developing system 40. In an example, the intelligent communication interface adapter 30 can analyze attribute code of a target protocol carried in a connection request to select the correct industrial protocol.

SNAP7 is an open source SIMATIC S7 PLC communication protocol, which can be applied to many different programming languages, such as C/C++, c #, Java, Javascript, etc. The SNAP7 protocol connector 70 can be fully or partially compatible with industrial networks such as Ethernet/IP 61, ProfiNET 62, OPC UA 63, Modbus TCP 64, PowerLink 65, Ethernet for Control Automation Technology (EtherCAT) 66, etc.

The automatic converter 10 may be encapsulated as a micro service container, such as a Docker container, to obtain information of each edge device through the intelligent communication interface adapter 30 set on each edge device, and to obtain information of each PLC through the local adapter 20 and/or corresponding intelligent communication interface adapter 30; based on a preset voting mechanism, to trigger each edge device and each PLC for connectivity detection and voting, and select an edge device and a PLC to be connected according to the number of votes of each of edge devices and PLCs. In an example, the third-party platform may be a cloud based low code platform, such as cloud PaaS (platform as a service).

In some embodiments, the automatic converter 10 may include a registration module 11, a voting system 12 and an automatic awareness system 13.

The registration module 11 is configured to obtain information of each edge device through the intelligent communication interface adapter 30 set on each edge device and obtain information of each PLC through the local adapter 20 or corresponding intelligent communication interface adapter 30. In some embodiments, the information of some PLCs may be obtained locally through the local adapter set on the local computer, and the information of some other PLCs deployed to each edge device may be obtained through the intelligent communication interface adapter set on each edge device. For example, before the PLC developing system 40 deploys a PLC, the information of the PLC may be obtained from the PLC developing system 40 through the local adapter 20. After the PLC developing system 40 deploys the PLC, the information of the PLC deployed on an edge device 3 may be obtained through a corresponding intelligent communication interface adapter 30 set on the edge device 3.

In some embodiments, information of edge devices and PLCs connected to an intranet may be automatically identified and registered based on the intranet discovery mechanism. In addition, if a user sets the registration mechanism, such as setting some devices not to be registered, the device identification and registration may be carried out according to the user's settings.

The voting system 12 is configured to trigger each edge device and each PLC for connectivity detection according to a set time interval, obtain voting performed by each edge device and each PLC on edge devices or PLCs connected with itself, as well as a state fed back by each edge device and each PLC, and obtain the number of votes and states of every edge device and every PLC.

The automatic awareness system 13 is configured to determine a PLC to be connected and an edge device to connect to the PLC according to the number of votes and the state of each edge device and each PLC, and to connect determined PLC through determined edge device. In some embodiments, the PLC in the state of ready and with the largest number of votes or the number of votes reaching a first set threshold may be regarded as the PLC to be connected, and the edge device in the state of ready and with the largest number of votes or the number of votes reaching a second set threshold may be determined as the edge device to connect to the PLC.

The methods for PLC connection incorporating teachings of the present disclosure can be implemented on the system for PLC connection according to the present disclosure. For details not disclosed in the embodiments of the method of the present disclosure, please refer to the corresponding description in the embodiments of the system of the present disclosure, which will not be repeated here.

Figure 2:
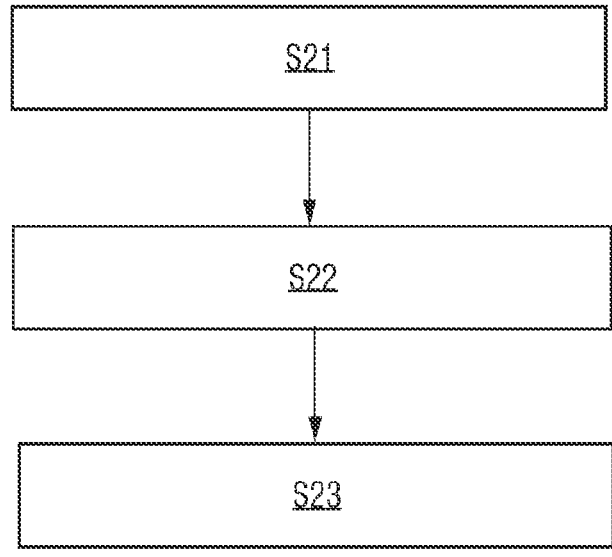
FIG. 2 is a flow diagram illustrating an example PLC connection incorporating teachings of the present disclosure.

FIG. 2 is a flow diagram illustrating an example PLC connection incorporating teachings of the present disclosure. As shown in FIG. 2, the method may include the following processes through an automatic converter deployed on a third-party platform.

At block S21, information of each edge device and each PLC connected to a network is obtained. At this block, the information of each edge device can be obtained through the intelligent communication interface adapter set on each edge device, the locally stored information of PLC may be obtained from the local such as the PLC developing system through the local adapter set on the local computer, and the information of the PLC deployed on each edge device may be obtained through the intelligent communication interface adapter set on each edge device.

At block S22, each edge device and each PLC are triggered for connectivity detection according to a set time interval, and voting performed by each edge device and each PLC on edge devices or PLCs connected with itself and a state fed back by each edge device and each PLC are obtained, so as to obtain the number of votes and states of every edge device and every PLC.

At block S23, a PLC to be connected and an edge device to connect to the PLC are determined according to the number of votes and states of every edge device and every PLC, and determined PLC is connected through determined edge device. In some embodiments, the third-party platform may include a cloud based low code platform, etc.

Not all blocks and modules in the above flow and schematic diagrams are necessary, and some blocks or modules can be ignored according to actual needs. The execution sequence of blocks is not fixed and can be adjusted as needed. The division of modules is only functional division for the convenience of describing. In actual implementation, a module can be realized by multiple modules, and the functions of multiple modules can also be realized by one module. These modules can be located in the same device or in different devices.

The hardware modules in above embodiments can be implemented mechanically or electronically. For example, a hardware module may include specially designed permanent circuits or logic devices (such as special-purpose processors, such as FPGA or ASIC) to complete specific operations. The hardware module may also include a programmable logic device or circuit temporarily configured by software (such as including a general-purpose processor or other programmable processor) for performing specific operations. As for the specific use of mechanical mode, or special permanent circuit, or temporarily configured circuit (such as configured by software) to realize the hardware module, it can be determined according to the consideration of cost and time.

In fact, the system for PLC connection provided by this implementation may be specifically implemented in various manners. For example, the system for PLC connection may be compiled, by using an application programming interface that complies with a certain regulation, as a plug-in that is installed in an intelligent terminal, or may be encapsulated into an application program for a user to download and use. When compiled as a plug-in, the system for PLC connection may be implemented in various plug-in forms. The system for PLC connection provided by this implementation manner of the present disclosure may also be implemented by using a specific technology, such as a Flash plug-in technology, a RealPlayer plug-in technology, an MMS plug-in technology, a MIDI staff plug-in technology, or an ActiveX plug-in technology.

The method for PLC connection may be stored in various storage mediums in an instruction storage manner or an instruction set storage manner. These storage mediums include, but are not limited to: a floppy disk, an optical disc, a DVD, a hard disk, a flash memory, a USB flash drive, a CF card, an SD card, an MMC card, an SM card, a memory stick, and an xD card. Moreover, it should be clear that an operating system operated in a computer can be made, not only by executing program code read by the computer from a storage medium, but also by using an instruction based on the program code, to implement some or all actual operations, so as to implement functions of any embodiment in the foregoing embodiments.

Figure 3:
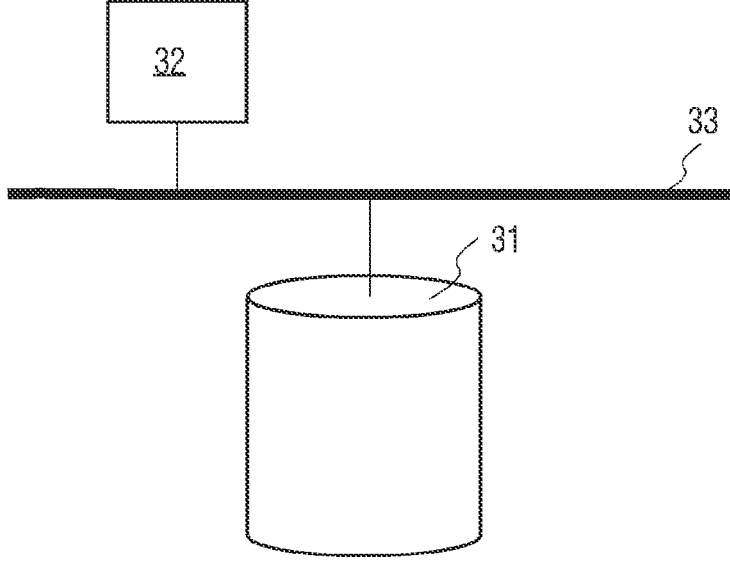
FIG. 3 is a schematic diagram illustrating another example system for PLC connection incorporating teachings of the present disclosure.

For example, FIG. 3 is a schematic diagram illustrating another example system for PLC connection incorporating teachings of the present disclosure. The system may be used to perform the method shown in FIG. 2, or to implement the system shown in FIG. 1.

As shown in FIG. 3, the system may include at least one memory 31 and at least one processor 32. In addition, some other components may be included, such as communication port, input/output controller, network communication interface, etc. These components communicate through bus 33, etc.

At least one memory 31 is configured to store a computer program. In one example, the computer program can be understood to include various modules of the system shown in FIG. 1. In addition, at least one memory 31 may store an operating system or the like. Operating systems include but are not limited to: Android operating system, Symbian operating system, windows operating system, Linux operating system, etc.

At least one processor 32 is configured to call the computer program stored in at least one memory 31 to perform a method for PLC connection described in examples of the present disclosure. The processor 32 can be CPU, processing unit/module, ASIC, logic module or programmable gate array, etc. It can receive and send data through the communication port. The I/O controller has an input device, which is used to input, output and display relevant data.

It can be seen from above mentioned technical solutions, an automatic converter is set on the third-party platform, a local adapter for accessing PLC information is set on the local computer, and an intelligent communication interface adapter for accessing PLC through industrial network protocol is set on the edge device, so that the automatic converter can obtain the information of each edge device and each PLC through the intelligent communication interface adapter and the local adapter, then trigger each edge device and each PLC to conduct connectivity detection and to vote according to a detection result, and then determine the PLC to be connected and the edge device to connect to the PLC according to the number of votes, then through the determined edge equipment to connect the determined PLC, the universality and effectiveness of PLC connection are improved.

As used herein, unless the context clearly supports exceptions, the singular forms "a" ("a", "an", "the") are intended to include the plural forms. It should also be understood that, "and/or" used herein is intended to include any and all possible combinations of one or more of the associated listed items. The number of the embodiments of the present disclosure are only used for description, and do not represent the merits of the implementations.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

8

What is claimed is:

1. A system for PLC connection, the system comprising:
an automatic converter set on a third-party platform;
a local adapter set on a local computer to access locally stored PLC information; and
a set of intelligent communication interface adapters set on respective edge devices to access a PLC through a communication protocol connector;
wherein the automatic converter obtains information of each respective edge device through the intelligent communication interface adapter, and obtains information of each PLC through the local adapter and/or corresponding intelligent communication interface adapter; and
based on a preset voting mechanism, triggers the edge devices and the PLC for connectivity detection and voting, and select an individual edge device and a PLC to be connected according to the number of votes of each respective edge device and each PLC.

2. The system according to claim 1, wherein the automatic converter comprises:
a registration module to obtain information of each edge device through the intelligent communication interface adapter set on each edge device, and to obtain information of each PLC through the local adapter and/or corresponding intelligent communication interface adapter;
a voting system to trigger each edge device and each PLC for connectivity detection according to a set time interval, obtain voting performed by each edge device and each PLC on those connected with itself, as well as a state fed back by each edge device and each PLC, and obtain the number of votes and states of every edge device and every PLC; and
an automatic awareness system to determine a PLC to be connected and an edge device to connect to the PLC according to the number of votes and the state of each edge device and each PLC, and to connect determined PLC through determined edge device.

3. The system according to claim 2, wherein the local adapter, the intelligent communication interface adapter, and the automatic converter are encapsulated into a micro service container respectively.

4. The system according to claim 2, wherein:
the third-party platform includes a cloud based low code platform;
the communication protocol is open source SNAP7 protocol; and
the locally stored PLC information is PLC information in TIA portal.

5. A device for PLC connection, the device comprising:
a registration module to obtain information of each edge device through the intelligent communication interface adapter set on each edge device, and to obtain information of each PLC through the local adapter and/or corresponding intelligent communication interface adapter;
a voting system to trigger each edge device and each PLC for connectivity detection according to a set time interval, obtain voting performed by each edge device and each PLC on those connected with itself, as well as a state fed back by each edge device and each PLC, and obtain the number of votes and states of every edge device and every PLC; and
an automatic awareness system to determine a PLC to be connected and an edge device to connect to the PLC according to the number of votes and the state of each edge device and each PLC, and to connect determined PLC through determined edge device.

6. A method for PLC connection, the method comprising:

obtaining information of each edge device and each PLC connected to a network;

triggering each edge device and each PLC for connectivity detection according to a set time interval, and obtaining voting performed by each edge device and each PLC on those connected with itself and a state fed back by each edge device and each PLC, so as to obtain the number of votes and states of every edge device and every PLC;

determining a PLC to be connected and an edge device to connect to the PLC according to the number of votes and states of every edge device and every PLC and connecting determined PLC through determined edge device.

7. The method according to claim 6, wherein the third-party platform includes a cloud based low code platform.

8. A system for PLC connection, the system comprising:

at least one memory storing a computer program; and at least one processor to call the computer program stored in the at least one memory to perform a method for PLC connection, the method comprising:

obtaining information of each edge device and each PLC connected to a network;

triggering each edge device and each PLC for connectivity detection according to a set time interval, and obtaining voting performed by each edge device and each PLC on those connected with itself and a state fed back by each edge device and each PLC, so as to obtain the number of votes and states of every edge device and every PLC;

determining a PLC to be connected and an edge device to connect to the PLC according to the number of votes and states of every edge device and every PLC and connecting determined PLC through determined edge device.

* * * * *